United States Patent Office 3,313,863
Patented Apr. 11, 1967

3,313,863
1,2 SUBSTITUTED ETHANES AS CATALYSTS FOR UNSATURATED POLYESTERS
Hermann Schnell, Krefeld-Urdingen, and Klaus Prater and Hans Rudolph, Krefeld-Bockum, Germany, assignors to Farbenfabriken Bayer Aktiengesellschaft, Leverkusen, Germany, a corporation of Germany
No Drawing. Filed Feb. 24, 1964, Ser. No. 347,025
Claims priority, application Germany, Feb. 25, 1963, F 39,105
6 Claims. (Cl. 260—864)

The present invention is concerned with catalyst-containing, hardenable, storable polyester moulding masses and with a process for the production of moulded articles therefrom.

Since the known polyester moulding masses, i.e. mixtures of the usual unsaturated polyesters with the usual copolymerizable monomeric compounds, only harden when heated to high temperatures and even then only slowly, it is technically practically unavoidable to initiate the copolymerization, which forms the basis of the hardening, by the addition of radical-forming catalysts. Although the polyester moulding masses mixed with such catalysts, usually acyl peroxides, ketone hydroperoxides or certain azo compounds, react only slowly at room temperature, this being the reason why they are generally also heated to bring about the hardening, they cannot be stored for a prolonged time even at room temperature. Therefore, the catalysts are usually added immediately before the working up of the moulding masses, i.e. the handling of these materials, which is generally not very easy and, under certain conditions, may involve some hazards, has to be the task persons who have to work up the moulding masses without having very much experience, in many cases.

The present invention is concerned with polyester moulding masses which already containing catalysts, are hardenable simply by heating and yet can be stored at room temperature and which because of their storage stability, can be marketed as such and can be handled substantially more easily by the worker. The new moulding masses consists essentially of mixtures of the usual unsaturated polyesters, of the usual copolymerizable monomeric compounds and of catalytic amounts of 1,2-substituted ethanes of the general formula:

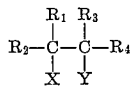

in which $R_1$ and $R_3$ are the same or different unsubstituted or substituted aromatic radicals, $R_2$ is a hydrogen atom or an unsubstituted or substituted aliphatic or aromatic radical, $R_4$ is an unsubstituted or substituted aliphatic or aromatic radical, and X and Y, which may be the same or different, are halogen atoms or hydroxyl groups which may be blocked, or amino groups which may be substituted.

These ethane derivatives have the surprising property that they are without any influence on the polyester moulding masses at room temperature, i.e. they initiate neither polymerization nor copolymerization nor give rise to any other reactions, but they catalyse the copolymerization of polyester moulding masses to an extent necessary for the production of moulded articles at elevated temperatures, i.e. in the temperature range between about 40° C., but preferably between 70° C. and about 300° C., evidently as a result of break down into C-radicals and the catalytic action of these radicals on the components of the copolymerization.

Catalysts in the meaning of the present invention are all 1,2-substituted ethanes which possess on both ethane carbon atoms at least one possibly substituted aromatic radical, as well as, in each case, a hydroxyl group, possibly blocked by etherification, esterification or acetalization, or a halogen atom, or a possibly substituted amino group, and in which at least one of the remaining valencies is satisfied by an unsubstituted or substituted aromatic or aliphatic radical. If the radicals $R_1$, $R_2$, $R_3$ and $R_4$ are exclusively of an aromatic nature, then the catalysts display their polymerization-initiating action even at comparatively low temperatures. The partial incorporation of aliphatic radicals, however, leads to an increase of the initiating temperature, as does the presence of a non-substituted hydrogen atom. As preferred compounds there can be regarded those in which $R_1=R_3$, $R_2=R_4$, and X and Y=hydroxyl. These compounds, known as pinacones, are especially easily obtainable by the reduction of the corresponding ketones.

The most typical representative of these ethane derivatives is benzpinacone. As further examples of this class of compounds, there may be mentioned: 4,4'-dichlorobenzpinacone, 4,4'-dibromobenzpinacone, 4,4'-diiodobenzpinacone, 4,4',3'',4'''-tetrachlorobenzpinacone, 2,4-2',4'-tetrachlorobenzpinacone, (as)-4,4''-dichlorobenzpinacone, (as) - 4,4''-difluorobenzpinacone, 4,4'-dimethylbenzpinacone, 3,3'-dimethylbenzpinacone, 2,2'-dimethylbenzpinacone, 3,4-3',4'-tetramethylbenzpinacone, 4,4'-dimethoxybenzpinacone, 2,4-2',4'-tetramethoxybenzpinacone, 4,4'-diphenylbenzpinacone, 4,4'-dichloro-4'',4'''-dimethylbenzpinacone, 4,4'-dimethyl-4'',4'''-diphenylbenzpinacone, 4,4'-di-(methylmercapto)-benzpinacone, 4,4',4'',4'''-tetra-(dimethylamino)-benzpinacone, 1,2-di-(3-pyridyl)-1,2-diphenyl-ethane-1,2-diol, xanthonpinacone, fluorenonepinacone, acetophenonepinacone, 4,4'-dimethyl-acetophenonepinacone, 4,4'-dichloro-acetophenonepinacone, 1,1,2-triphenyl - propane-1,2-diol, 1,2,3,4-tetraphenylbutane-2,3-diol, 1,2-diphenylcyclobutane-1,2-diol, propiophenonepinacone, 4,4'-dimethylpropio-phenone-pinacone, 2,2'-ethyl-3,3'-dimethoxy-propiophenonepinacone, 1,1,1,4,4,4-hexafluoro-2,3-diphenyl-butane-2,3-diol.

As further compounds according to the present invention, there may be mentioned: benzpinacone-mono-methylether, benzpinacone-dimethylether(producible from 1,2-dichloro-tetraphenylethane and Na-methylate), benzpinacone-cono-ethylether, benzpinacone-diethylether, benzpinacone-mono-phenylether, benzpinacone-diphenylether, further the cyclic carbonate of the benzpinacone, the cyclic sulfite of the acetophenonepinacones and benzpinacone-dibenzoate, furthermore 1,2-dichloro-tetraphenylethane, triphenylglycol, 1,2,3-triphenyl-propane-1,2-diol and triphenyl-ethanolamine.

As a rule, the catalysts can easily be incorporated in the polyester moulding masses at room temperature or at a moderately elevated temperature. The compounds containing only aromatic radicals dissolve somewhat more slowly than the mixed aliphatic-aromatic substituted compounds, but the speed of dissolving can be increased by suitable substitution of the aromatic radicals, for example, by alkyl radicals. The dissolving can also be facilitated by the concurrent use of inert organic solvents, such as solubilizers based on ethers, ketones or esters. A further dissolving process which is especially suitable when catalysts with a high initiation temperature are used, consists in that the catalysts are added to the moulding masses during the production thereof by mixing them with the still hot, liquid, unsaturated polyester immediately after its preparation, or to the copolymerizable monomer before its addition to the polyester.

The catalysts are preferably added to the polyester moulding masses in amounts of about 0.1 to about 10%, referred to the moulding masses. They can be used alone or as mixtures, possibly also in admixture with polymerization catalysts of another kind, whereby the lower limit of 0.1% for an individual substance can then also be further reduced. Amounts substantially exceeding 10% can be deleterious, since they can impair the properties of the hardened products.

By the term unsaturated polyesters within the meaning of the present invention are, as mentioned, to be understood the usual polycondensation products which consist of ester-like linked residues of polyvalent, especially divalent, carboxylic acids and polyvalent, especially divalent, alcohols, as well as possibly also residues of monovalent alcohols and/or of monovalent carboxylic acids, whereby the residues must contain at least partially unsaturated groups. Examples of acids are, inter alia, maleic acid, fumaric acid, itaconic acid, mesaconic acid, citraconic acid, succinic acid, glutaric acid, adipic acid, phthalic acid, tetrachlorophthalic acid, hexachloroendomethylenetetrahydrophthalic acid, trimellitic acid, benzoic acid, linseed oil fatty acid and ricinoleic fatty acid. Examples of alcohols are, inter alia, ethylene glycol, diethylene glycol, propane-butane and hexane-diols, trimethylolpropane, pentaerythritol, butanol and tetrahydrofurfuryl alcohol.

There may also be mentioned moulding masses which, apart from the residues of $\alpha,\beta$-unsaturated dicarboxylic acids as components of the polyesters, also contain $\beta,\gamma$-unsaturated ether residues, be it also as components of the polyester, for example, according to British patent specification No. 810,222, be it as components of further mixture components, for example, according to German patent specifications Nos. 1,067,210 and 1,081,222, which, besides their copolymerizability, are, at the same time, air-drying.

As copolymerizable monomeric compounds, there are also suitable the unsaturated compounds usual in polyester technology with vinyl groups which may be substituted in the $\alpha$-position or allyl groups which may be substituted in the $\beta$-position, such as styrene, vinyl-toluene, divinyl-benzene, vinyl acetate, acrylic acid and its esters, acrylonitrile, methacrylic acid and its corresponding derivatives, as well as allyl esters, such as allyl acetate, allyl acrylate, phthalic acid diallyl ester, triallyl phosphate and triallyl cyanurate.

Although the concurrent use of inhibitors is not necessary, the addition of known inhibitors, such as, p-benzoquinone, 2,5-di-tert-butyl-quinone, hydroquinone, tert.-butyl-pyrocatechol and 4-ethyl-pyrocatechol, as well as copper compounds and hydroxylamine derivatives, is not to be excluded.

Furthermore, the moulding masses can contain any of the additives known from polyester technology, such as fillers or plasticizers, and also fibers or fabrics of glass, synthetic resins or textile products, as well as dyestuffs and compounds which ensure the protection against light, heat or burning, also materials which promote air-drying, such as cobalt salts, or which prevent the hardening inhibiting influence of oxygen, such as wax or paraffin additives, as well as any other additives desirable for the processing of polyesters.

The moulding masses according to the present invention are, however, not only distinguished by the aforementioned advantage of being storable practically indefinitely at room temperature in spite of the catalyst content, but also in that the course of the copolymerization and hardening can be easily and reliably controlled by the control of temperature. In particular, the polymerization reactions are not only accelerated with increasing temperature, as is more or less also the case with the use of the customary catalysts, but by the use according to the present invention of the above-defined ethane derivatives as catalysts, it is, in contradistinction to the use of the usual catalysts, also possible, without difficulty, to slow down or to stop completely the polymerization reactions by reduction of the temperature. Consequently, the moulding masses according to the present invention are, in particular, suitable for carrying out the production of hardened moulded articles in two or more steps, i.e. to produce, in a predetermined manner, by heating the moulding masses and cooling them at a given time, prepolymerizates of any desired consistency, for example, those of more or less viscous, gel-like or solid (e.g. powder-like) form, and to harden these at any later time by reheating and recooling them possibly several times in at least one further step, while moulding.

As in the case of the production of hardened moulded articles in several steps from other synthetic resins, suggestions have admittedly also already been made for such a working up of polyester moulding masses, thus, for example, to polymerize polyester moulding masses in the presence of the usual organic solvents which are themselves not copolymerizable, preferably with the addition of the usual catalysts, without moulding to the shape of the end products, for such a period of time that the proportion of copolymerizable monomeric compounds are wholly or, to a large extent, polymerically bound, to interrupt the prepolymerization by cooling the reaction mixture to a temperature of, for example, 0° C. and possibly adding inhibitors, and finally to harden the so-obtained prepolymerizates, possibly with the addition of further copolymerizable compounds or thermoplastic compounds, to give moulded articles. However, with this process it is scarcely possible to control with certainty the production of the prepolymerizate on a technical scale, since the polymerization reactions in the presence of the usual catalysts can only be stopped with difficulty or not at all by cooling, quite apart from the fact that the solvent must, as a rule, be removed from the reaction mixture, which means not only an additional technical expenditure, but whereby the temperature must also be increased again, a further advance of the polymerization reactions thereby being unavoidable. On the other hand, the addition of inhibitors often considerably disturbs the final hardening.

In contradistinction thereto, the production of prepolymerizates with the use of the moulding masses according to the present invention or the stepwise production of moulded articles therefrom, not only affords the known advantages of a multistep process, such as the increased possibilities of working up more or less viscous, gel-like or solid prepolymerizates, in comparison with the non-prepolymerized moulding masses, but also the partial prevention of shrinkage upon hardening by the production of a more or less advanced prepolymerized intermediate product. The prepolymerizates produced from the moulding masses according to the present invention are, in contradistinction to those obtainable by the known processes, of practically unlimited storability so that the course of the final hardening remains unaffected even by a long interruption of the hardening process.

For the production of the prepolymerizates, the new catalysts are mixed with the unsaturated polyester moulding masses, possibly with the use of a solubilizer, at a temperature which, as can readily be ascertained by simple preliminary tests, lies below the initiation temperature of the radical former and the so modified moulding mass is allowed to polymerize at an elevated temperature until the prepolymerizates have reached the desired consistency. The polymerization is then interrupted by cooling, for example, to room temperature. By precise adjustment of the temperature control to the temperature dependence of the activity of the selected catalyst, it is possible, without difficulty, to manufacture reproducibly uniform prepolymers in a specified manner. The prepolymerizates thereby obtained, which are of practically unlimited storability, can then, as and when required, be finally hardened to, for example, moulded articles by reheating, possibly under pressure.

If the previously mentioned addition materials usual in polyester technology have not been added during the prepolymerization, they can be incorporated in the prepolymerizates before hardening, in the same way as additional copolymerizable monomeric compounds. Although the process according to the present invention proceeds, in principle, without the additional admixture of catalysts in the prepolymerization step, additional catalysts of the same or another kind can, if desired, be added to the prepolymerizates for the special promotion of the final hardening.

Since the prepolymerizates can be obtained in any desired consistency and remain practically unchanged at room temperature, numerous methods of working up can be used. According to their consistency, they can be worked up by the injection, moulding or extrusion processes or can, if desired, be used as free-flowing moulding masses. They are also suitable for the production of coatings and for the impregnation of glass fabrics, textile products or paper strips. By the admixture of propellants related to the hardening temperature of the prepolymerizates, foamed materials can readily be produced from the moulding masses according to the present invention or from their prepolymerizates.

The following examples are given for the purpose of illustrating the present invention, the parts and percentages being by weight:

Example 1

An unsaturated polyester with the acid number 47, produced by the condensation of 152 parts of maleic anhydride and 141 parts of phthalic anhydride with 195 parts of propane-1,2-diol, stabilized by the addition of 0.045 part of hydroquinone, is dissolved in styrene as a 65% solution. 2% benz-pinacone are then dissolved in this solution at 40° C. No alteration can be ascertained in the so obtained moulding mass after storage at room temperature for several months. After heating for 4 hours at 80° C. in a closed mould, a hardened moulded article is obtained.

Example 2

The moulding mass produced according to Example 1 is poured between two glass plates with a layer thickness of about 3 mm., left for 75 minutes at 80° C. and then cooled to room temperature. A tack-free, flaccid prepolymerizate is obtained. Button-shaped test samples are punched from the prepolymerizate with the help of a cork borer and hardened by tempering for 3 hours at 80° C. After storage for 2 months at room temperature, the punching and the hardening steps can be repeated with equal success on the unchanged, flaccid and readily workable prepolymerizate.

Example 3

The 65% styrene solution of the unsaturated polyester of Example 1 is used for the following tests.

Table 1 shows the hardening action of some compounds admixed with the moulding mass at 40–50° C., under different conditions. The tests are, as already described in Example 2, carried out with about 3 mm. thick layers of the masses according to the present invention. The prepolymerizate consistency obtained in each case is illustrated by the Shore D hardness.

TABLE 1

| Amount of hardener | Polymerization temperature in ° C. | Polymerization period | Shore hardness of the prepolymerizate |
|---|---|---|---|
| 2% 1,2-dichlorotetraphenylethane | 120 | 30 min | 50 |
| 2% 4,4'-methylbenzpinacone | 120 | 15 min | 45 |
| 2% 3,4-3',4'-tetramethylbenzpinacone | 80 | 70 min | 30 |
| 2% 4,4'-dichlorobenzpinacone | 80 | 80 min | 60 |
| 2% 2,4-2',4'-tetrachlorobenzpinacone | 80 | 100 min | 60 |
| 2% 4,4'-dimethoxybenzpinacone | 80 | 80 min | 60 |
| 2% 2,4-2',4'-tetramethoxybenzpinacone | 100 | 20 min | 20 |
| 2% triphenyl-ethanolamine | 80 | 100 min | 60 |
| 2% cycl. sulfite of the acetophenonepinacone | 120 | 35 min | 20 |
| 2% 1,2-methoxy-tetraphenylethane | 80 | 60 min | 10 |
| 0.5% benzpinacone | 70 | 3.5 hours | 10 |
| 1% benzpinacone | 70 | 3.5 hours | 38 |
| 2% benzpinacone | 70 | 3.5 hours | 70 |
| Do | 70 | 2 hours | 34 |
| Do | 70 | 3 hours | 60 |

All the prepolymerizates mentioned in Table 1 can be hardened to moulded articles by tempering for 2 hours at 120° C.

Example 4

The 50% styrene solution of the unsaturated polyester of Example 1 possesses a viscosity of 94 cp. It is mixed with 2% acetophenone-pinacone and stirred for 17 hours at 85° C. After cooling to room temperature, there is obtained a viscous prepolymerizate with a viscosity of 3600 cp. 10 grams of the still free-flowing prepolymerizate are placed in a test tube and hardened to a hard moulded article by tempering for 3 hours at 120° C.

Example 5

By the condensation of 244 parts of maleic anhydride and 75 parts of phthalic anhydride with 251 parts of propane-1,2-diol, there is produced an unsaturated polyester with the acid number 32 which is stabilized by the addition of 0.052 parts of hydroquinone. Immediately after termination of the condensation, 65 parts of the still liquid polyester are admixed at 100° C. with 37 parts of a 5.6% solution of acetophenonepinacone in styrene. The mixture obtained is subsequently immediately cooled to room temperature. It is storable at room temperature.

Gelled prepolymerizates of various consistency can be obtained from the moulding mass, as already described in Examples 2 and 3. Table 2 shows the influence of the polymerization temperature on the nature of the prepolymerizates.

TABLE 2

| Amount of hardener | Polymerization temperature in ° C. | Polymerization period | Shore hardness of the prepolymerizate |
|---|---|---|---|
| 2% acetophenonepinacone | 120 | 1 hour | 5 |
| Do | 130 | 1 hour | 10 |
| Do | 140 | 1 hour | 52 |

The prepolymerizates are hardened to moulded articles by tempering for 6 hours at 130° C.

Example 6

By the condensation of 172 parts of maleic anhydride and 66 parts of phthalic anhydride with 59 parts of glycol and 121 parts of butane-1,3-diol in the presence of 0.066 part of hydroquinone, there is produced an unsaturated polyester with the acid number 22 which is then dissolved in styrene as a 65% solution. 2% benzpinacone are admixed at 40° C., with stirring.

100 parts of this storable moulding mass are mixed with 5 parts of zinc stearate, 15 parts of talc and 75 parts of dolomite (grain size $<20\mu$) and subsequently serve for the impregnation of 60 parts of a commercial glass matting. By prepolymerizing for 4½ hours at 70° C., there is obtained a tack-free, storable matting, from which are prepared pieces with a size of 120 x 120 mm. 110 grams of the cut material are then moulded in a standard device (DIN 53470, standard plate 4 mm.) at 140° C. and 30 kg./cm.$^2$ pressure for 3 minutes. Measurements are made on standard small rods from the so obtained moulded plate, giving for the bending strength an average of 2125 kp./cm.$^2$ (DIN 53452) and for the impact strength an average of 55.5 cm. kp./cm.$^2$ (DIN 53453).

*Example 7*

100 parts of the moulding mass of Example 6, mixed 2% benzpinacone, are mixed with 240 parts of dolomite (grain size <20μ), 60 parts of talc, as well as 5 parts of zinc stearate, and treated for 45 minutes at 90° C. in a kneader. After cooling, the prepolymerized mass is comminuted in a cross beater mill to a grain size of 3–4 mm. diameter. A free-flowing mass is obtained. After storage for 4 weeks, 280 grams of the unchanged, friable moulding mass are moulded in a standard device (DIN 53470, for the production of standard rods) at 140° C. and 30 kg./cm.$^2$ pressure for 3 minutes. The standard rods obtained have an average impact strength of 25.2 cm. kp./cm.$^2$ (DIN 53453).

We claim:

1. Catalyst - containing, heat hardenable, polyester masses storable at room temperatures, which comprise mixtures of unsaturated polyester polymeric condensation reaction products of α,β-unsaturated dicarboxylic acids with polyols and copolymerizable monomeric compounds with a catalytic amount of at least one 1,2-substituted ethane selected from the group consisting of 1,2-di-(3-pyridyl)-1,2-diphenyl-ethane-1,2-diol, xanthonpinacone, fluorenonepinacone, 1,2-diphenyl-cyclobutane-1,2-diol, the cyclic carbonate of benzpinacone, the cyclic sulfite of acetophenonepinacone, benzpinacone-dibenzoate and 1,2-substituted ethanes of the formula:

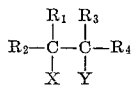

wherein $R_1$ and $R_3$ are selected from the group consisting of phenyl and substituted phenyl, the substituents of said substituted phenyl being selected from the group consisting of halogen, methyl, ethyl, methtoxy and phenyl; $R_2$ and $R_4$ are selected from the group consisting of hydrogen, methyl, ethyl, propyl, halomethyl, benzyl, phenyl and substituted phenyl, the substituents of said substituted phenyl being selected from the group consisting of halogen, methyl, methoxy and phenyl and X and Y are selected from the group consisting of halogen, hydroxyl, methoxy, ethoxy, phenoxy and amino.

2. Polyester masses according to claim 1, wherein the substituted ethane is present in an amount of about 0.1 to about 10%, referred to the moulding mass.

3. Polyester masses according to claim 1, wherein the mixture of unsaturated polyester and copolymerizable monomeric compound has been partially polymerized to a viscous to solid state.

4. Process for the production of moulded bodies, wherein a moulding mass according to claim 1 is heated in a mould to a temperature of from about 70 to 300° C. until the mass is fully polymerized.

5. Process for the production of molded bodies, wherein a prepolymerizate according to claim 3 is heated in a mold to a temperature between about 70 and 300° C. until the mass is fully polymerized.

6. Catalyst - containing, heat - hardenable polyester masses storable at room temperature, which comprises mixtures of unsaturated polyester, polymeric condensation reaction products of α,β-unsaturated dicarboxylic acids with polyols and copolymerizable monomeric compounds with a catalytic amount of at least one catalyst selected from the group consisting of benzpinacone, 1,2-dichlorotetraphenylethane, 4,4'-methyl benzpinacone, 3,4-3',4'-tetramethylbenzpinacone, 4,4'-dichloro benzpinacone, 2,4-2',4'-tetrachlorobenzpinacone, 4,4'-dimethoxy benzpinacone, 2,4-2',4'-tetramethoxy benzpinacone, triphenyl ethanolamine, acetophenone-pinacone and 1,2-methoxy tetraphenylethane.

References Cited by the Examiner

UNITED STATES PATENTS

| | | | |
|---|---|---|---|
| 2,413,973 | 1/1947 | Hawk | 260—89.5 |
| 2,935,489 | 5/1960 | Bader et al. | 260—864 |
| 3,028,360 | 4/1962 | Brooks et al. | 260—864 |
| 3,031,301 | 4/1962 | Agens | 260—865 |
| 3,125,546 | 3/1964 | Pinner et al. | 260—884 |
| 3,157,713 | 11/1964 | Leese et al. | 260—884 |
| 3,214,494 | 10/1965 | Harris | 260—880 |
| 3,214,497 | 10/1965 | Harris | 260—880 |

OTHER REFERENCES

Bevington, J. C.: Radical Polymerization, Academic Press, N.Y., 1961, QD 471 B48 C.2, pages 27 and 28 relied on.

MURRAY TILLMAN, *Primary Examiner.*

J. T. GOOLKASIAN, *Assistant Examiner.*